United States Patent
Jacon et al.

(10) Patent No.: US 11,585,292 B2
(45) Date of Patent: Feb. 21, 2023

(54) OUTER SHROUD OF AN INTERMEDIATE CASING FOR A DUAL FLOW TURBINE ENGINE FOR AN AIRCRAFT, COMPRISING IMPROVED AIR-SEALING AND FIRE-RESISTANCE DEVICES

(71) Applicant: SAFRAN AIRCRAFT ENGINES, Paris (FR)

(72) Inventors: Bruno Alexandre Didier Jacon, Moissy-Cramayel (FR); Baghdad Achbari, Moissy-Cramayel (FR); Thomas Claude Broage, Moissy-Cramayel (FR); Florent Robert André Godin, Moissy-Cramayel (FR); Joël François Roudil, Moissy-Cramayel (FR); Hervé Simonotti, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 155 days.

(21) Appl. No.: 16/969,228

(22) PCT Filed: Feb. 13, 2019

(86) PCT No.: PCT/FR2019/050311
§ 371 (c)(1),
(2) Date: Aug. 12, 2020

(87) PCT Pub. No.: WO2019/158854
PCT Pub. Date: Aug. 22, 2019

(65) Prior Publication Data
US 2021/0003098 A1    Jan. 7, 2021

(30) Foreign Application Priority Data
Feb. 14, 2018 (FR) .................................. 1851253

(51) Int. Cl.
*F02K 1/80* (2006.01)
*B64D 27/10* (2006.01)
(Continued)

(52) U.S. Cl.
CPC ................. *F02K 1/80* (2013.01); *B64D 27/10* (2013.01); *F02C 7/28* (2013.01); *F02K 3/025* (2013.01)

(58) Field of Classification Search
None
See application file for complete search history.

(56) References Cited

U.S. PATENT DOCUMENTS 2,716,563 A * 8/1955 Seneschall .............. F16L 27/10
  285/364
7,506,499 B2 * 3/2009 Fert ........................ F01D 9/065
  60/226.1

(Continued)

FOREIGN PATENT DOCUMENTS

WO    2012022900 A1    2/2012

OTHER PUBLICATIONS

Search Report issued in French Patent Application No. 1851253 dated Oct. 12, 2018.
(Continued)

*Primary Examiner* — Kayla Mccaffrey
(74) *Attorney, Agent, or Firm* — Pearne & Gordon LLP (57) ABSTRACT

An outer shroud of an intermediate casing for a dual flow turbine engine for an aircraft, the shroud including: an annular downstream portion provided with a shroud opening passing through an annular downstream edge of the shroud; a connecting member (50) attached to the annular downstream portion, and intended to attach an arm that passes through a secondary flow path; an air-sealing and fire-resistance device including: a portion including: a pad
(Continued)

arranged in a hollow annular area of the annular downstream edge of the shroud; a blade protruding from the pad and clamped between a circumferential end and the radially outer end of the arm, a leaf spring (pressing the pad into the hollow annular area.

11 Claims, 5 Drawing Sheets

(51) Int. Cl.
*F02C 7/28* (2006.01)
*F02K 3/02* (2006.01)

(56) References Cited

U.S. PATENT DOCUMENTS

| | | | | |
|---|---|---|---|---|
| 7,661,272 | B2* | 2/2010 | Gagneux | F01D 9/065 |
| | | | | 60/796 |
| 2007/0084216 | A1* | 4/2007 | Mazeaud | F02K 3/04 |
| | | | | 60/802 |

OTHER PUBLICATIONS

International Search Report for PCT/FR2019/050311 dated Jun. 11, 2019.
Written Opinion for PCT/FR2019/050311 dated Jun. 11, 2019.
Application document as-filed for US patent application entitled: Fire Resistance Device Intended to be Interposed Between an Upstream End of an Aircraft Turbine Engine Mounting Structure and a Cowling of the Turbine Engine Delimiting an Inter-Flow Compartment, U.S. Appl. No. 16/970,035, filed Aug. 14, 2020.

* cited by examiner

OUTER SHROUD OF AN INTERMEDIATE CASING FOR A DUAL FLOW TURBINE ENGINE FOR AN AIRCRAFT, COMPRISING IMPROVED AIR-SEALING AND FIRE-RESISTANCE DEVICES

This is the National Stage of PCT international application PCT/FR2019/050311, filed on Feb. 13, 2019 entitled "OUTER SHROUD OF AN INTERMEDIATE CASING FOR A DUAL FLOW TURBINE ENGINE FOR AN AIRCRAFT, COMPRISING IMPROVED AIR-SEALING AND FIRE-RESISTANCE DEVICES", which claims the priority of French Patent Application No. 1851253 filed Feb. 14, 2018, both of which are incorporated herein by reference in their entirety.

TECHNICAL FIELD

The invention relates to air-sealing and fire resistance functions between a fan compartment and the fan flow stream of a dual flow turbine engine for an aircraft. It more particularly relates to performing these functions at a junction between the outer shroud of an intermediate casing of the turbine engine, and an arm that passes radially through the fan flow stream.

The invention is applicable to all types of dual flow turbine engines, and particularly to a turbojet.

STATE OF PRIOR ART

In a dual flow turbine engine for an aircraft, there are usually one or several arms that pass radially through the fan flow stream, downstream from the fan. This arm is typically arranged so as to connect a fan compartment located around the outer shroud of an intermediate casing, to an inter-flow compartment. Conventionally, these two compartments house equipment and auxiliaries, while the arm interposed between the two provides the passage for different elements such as electrical cables, and/or fluid pipes.

The radially outer end of such an arm is fixed to the outer shroud of the intermediate casing, at a through opening in this shroud, by means of a connection element of the perforated connection plate type. The downstream annular edge of this outer shroud is interrupted, such that it has two circumferential end surfaces facing each other, and delimiting a space between them to house the radially outer end of such an arm.

However, the presence of the opening on the outer shroud generates air sealing and fire resistance problems at the two circumferential end surfaces of the downstream annular edge of the shroud. This is explained firstly by the fact that a gap is observed between each of these two circumferential end surfaces, and the radially outer end of the arm. This is also explained by the fact that the perforated plate is located radially under the downstream annular edge of the shroud, in contact with a hollow annular zone open radially inwards and defined by the radially internal surface of the downstream edge. The passage between the perforated plate and this radially internal surface of the downstream edge, and the gap mentioned above, form sources of air leaks from the fan flow stream towards the fan compartment, and risks of fire propagation from this compartment to the flow stream.

SUMMARY OF THE INVENTION

In order to at least partially solve the problems mentioned above that arise with solutions according to prior art, the first purpose of the invention is an outer shroud of the intermediate casing for a dual flow turbine machine for an aircraft, according to the characteristics given in claim 1.

Preferably, the air sealing and fire resistance device comprises:
an air sealing and fire resistance part comprising:
a first contact device arranged in the hollow annular zone of the downstream annular edge of the shroud, this first contact element having a contact surface with a shape complementary to the shape of said radially internal surface delimiting this hollow annular zone;
a second contact element projecting from the first contact element and extending circumferentially beyond the circumferential end surface of the junction zone concerned, towards the other circumferential end surface, the second contact element bearing on the circumferential end of the junction zone concerned, and that will be tightened between this circumferential end and the radially external and of the arm.

Preferably, the air sealing and fire resistance device also comprises:
an elastic return means bringing the first contact element into contact inside the hollow annular zone, the elastic return means comprising a first end fixed on the circumferential end of the junction zone concerned, and a second opposite end fixed on the first contact element.

Consequently, the air sealing and fire resistance device has a good performance, and is perfectly integrated into its environment, without any risk of extending inappropriately in a prohibited zone.

The use of an elastic return means makes sure that the first contact device is correctly in contact in the hollow zone of the downstream edge of the shroud, despite some precision defects resulting from dimensional tolerances associated with the elements present. The elastic return means thus provides a contact pressure of the first element in the hollow zone, pressure that is then accentuated during operation of the turbine engine, by the additional pressure of air circulating in the fan flow stream.

The first contact element also forms a physical barrier like a plug, preventing air and fire from transiting circumferentially through this hollow zone of the downstream edge of the shroud. The second contact means forms a physical barrier preventing air and fire from transiting radially through the gap delimited between the radially outer end of the arm, and the circumferential end surface of the interrupted downstream edge of the shroud. Consequently the adopted device advantageously provides air sealing and fire resistance between the fan compartment and the fan flow stream, at sensitive junction zones resulting from the interruption to the downstream annular edge of the shroud.

Finally, this design protects the housing space that will contain the outer radial end of the arm, so that this arm can be installed later without constraint, for example by a third party.

Preferably, the first contact element is a pad, the second contact element is a ledge, and the elastic return means is a plate spring. Nevertheless, the first and second contact elements and the elastic return means can be made in other forms, without going outside the framework of the invention.

In the following, reference will be made to the pad, to the ledge and to the plate spring, but the technical characteristics described below are also applicable when the first and second contact elements, and the elastic return means, are made in other forms.

Preferably, the contact surface of the pad matches the entire angular sector of the radially internal surface delimiting the hollow annular zone, locally at the pad, and this pad preferably has a radially internal part outside said hollow annular zone. In other words, at least one angular sector in this hollow annular zone is completely filled in by the pad, to form an even higher performance physical barrier.

Preferably, the pad has a circumferential pad end surface located approximately in the same plane as the circumferential end surface of the downstream annular circumferential edge of the shroud, in the part located radially outwards from the ledge. This makes it possible to keep the housing space that will hold the external radial end the arm, as precisely as possible.

Preferably, the ledge comprises a reduced thickness connection zone with the pad. Due to this reduced thickness, the connection zone is flexible, enabling pivoting between the pad and the ledge. Thus, this flexible junction deforms easily in the elastic domain, and only slightly resists the contact force generated by the plate spring on the pad.

Preferably, said air sealing and fire resistance part is formed by the superposition of at least one layer of elastomer material, preferably a silicone elastomer material, and at least one fibrous layer made of ceramic, glass or meta-aramid (poly(m-phenylene isophthalamide)), along the radial direction. Nevertheless, other types of layers are possible without going outside the scope of the invention. It will be noted that a ceramic fabric layer is particularly efficient for the fire resistance function, while a glass fibre layer can stiffen the stack and limit creep of the elastomer in the plane orthogonal to the superposition direction of the layers, if a mechanical stress is applied along this direction. Finally, a layer of meta-aramid fibres also enables such stiffening, and can be placed at the contact surface of the pad to limit risks of damage in contact with sharp portions of the outer shroud.

Preferably, said air sealing and fire resistance part comprises at least one glass fibre layer extending through the pad and the ledge.

Preferably, each circumferential end has a spot facing forming a seat for the ledge of the air sealing and fire resistance device. This makes it easy to obtain a substantially plane surface for the radially outer end support of the arm, while being composed of several distinct superposed elements.

Preferably, the depth of the hollow annular zone of the downstream annular edge of the shroud is between 3 and 5 mm.

Preferably, said air sealing and fire resistance part is made by compression moulding, and the contact surface of the pad is preferably machined.

Another purpose of the invention is a dual flow turbine engine for an aircraft, comprising an intermediate casing outer shroud as described above, and an arm passing radially through a fan flow stream of the turbine engine, the turbine engine having a fan compartment and an interflow-stream compartment connected by said arm, the radially outer end of which is forced into contact with the radially external surface of the two circumferential ends, and in contact with the second contact elements associated with these two ends.

Other advantages and characteristics of the invention will become clear after reading the following detailed non-limitative description.

BRIEF DESCRIPTION OF THE DRAWINGS

This description will be made with reference to the appended drawings among which.

DETAILED DESCRIPTION OF PREFERRED EMBODIMENTS

Figure 1:
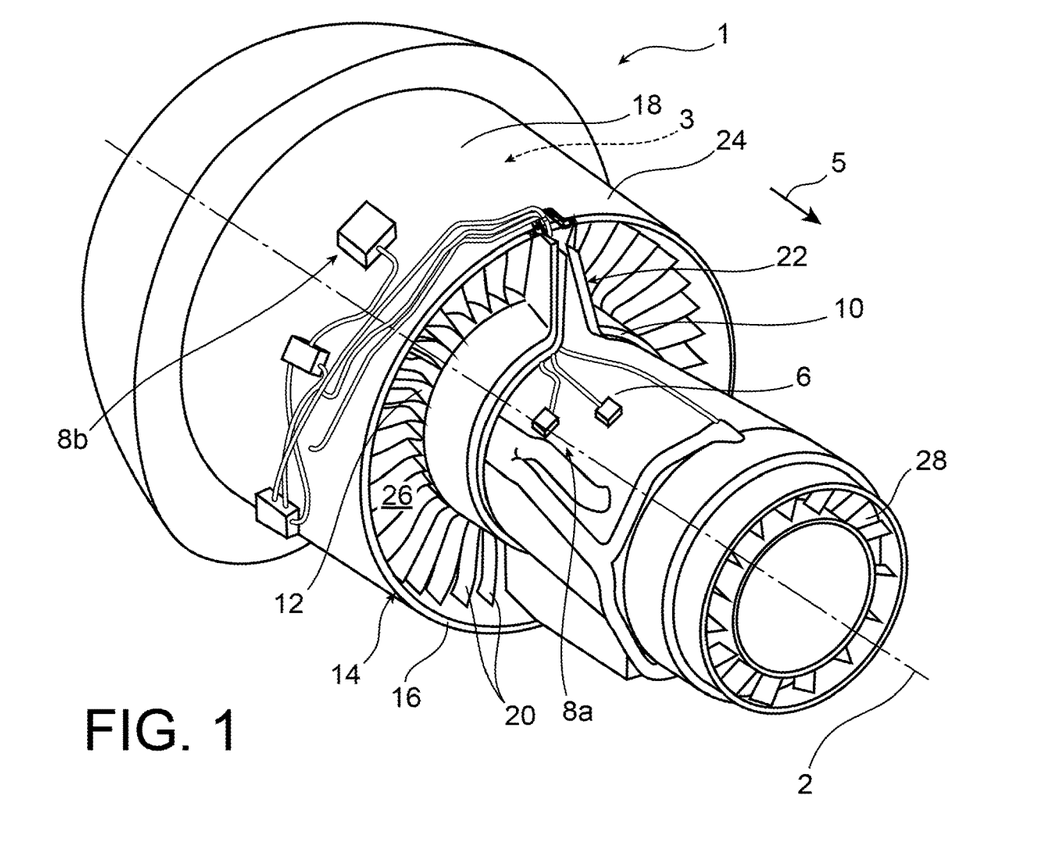
FIG. 1 is a perspective view of a dual flow turbojet according to a preferred embodiment of the invention.
Figure 2:
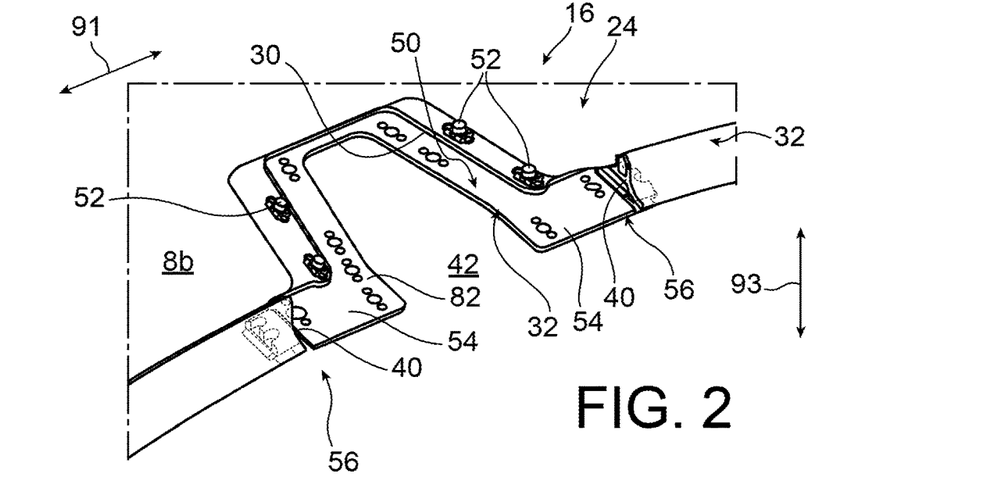
FIG. 2 represents a partial perspective view of an outer shroud of the intermediate casing installed on the turbojet shown on FIG. 1.

Firstly with reference to FIG. 1, the figure shows an aircraft turbine machine 1 according to a preferred embodiment of the invention. It is preferably a dual flow twin-spool turbojet.

The turbine engine 1 has a longitudinal central axis 2, around which its different components extend. It comprises, from upstream to downstream along a principal direction 5 of the gas flow through this turbine engine, a fan 3 then a gas generator conventionally composed of compressors, a combustion chamber and turbines. These elements of the gas generator are surrounded by a central casing 6, also called the "core" casing that radially delimits the interior of an inter-flow compartment 8a. This compartment 8a is delimited radially outwards by one or several covers, including an upstream ring 10 that is the only one shown on FIG. 1. The upstream ring 10 is formed in the downstream continuity of a hub 12 of an intermediate casing 14 of the turbojet. The intermediate casing 14 also comprises an outer shroud 16 located in the downstream continuity of a fan casing 18. It also comprises outlet guide vanes 20, formed downstream from the fan blades and connecting the hub 12 to the outer shroud 16.

The fan casing 18 and the outer shroud 16 together delimit a fan compartment 8b, in the radially inwards direction. This compartment 8b is also delimited in the radial outwards direction by one or several covers (not represented), forming part of a pod of the turbojet. Like the inter-flow compartment 8a, this compartment 8b houses equipment and auxiliaries, as is widely known in prior art.

One or several arms 22 are provided to connect the two compartments. For example, it can be two arms 22 installed on the turbojet, arranged in the 12 o'clock and 6 o'clock positions respectively. These arms 22 are hollow, and are used for example to circulate electrical cables and/or fluid pipes. More precisely, these arms connect the downstream part 24 of the outer shroud 16, to the upstream ring 10. To achieve this, they pass through a fan flow stream 26 of the turbojet, this flow stream being partly delimited in the outwards direction by the shroud 16 and by the covers (not represented) located downstream from the shroud, and partly delimited in the inwards direction by the upstream ring 10 of the inter-flow compartment 8*a*. The fan flow stream 26 is additional to a core engine flow stream 28, that passes conventionally through the gas generator.

The invention relates to a junction between the arms 22 and the outer shroud 16 of the intermediate casing 14. In the remainder of this description, the arm concerned will be the arm in the 12 o'clock position, but the invention could obviously be applied to any other arm 22 of the turbojet 1.

With reference to FIGS. 2 to 6, a preferred embodiment of the outer shroud 16 and its cooperation with the arm 22 will be described. The outer shroud 16 has a circumferential direction 91 and a radial direction 93, relative to the longitudinal central axis 2.

The downstream annular part 24 of the shroud 16 is provided with a shroud opening 30, that resembles a notch opening in the downstream axial direction. The opening 30 thus passes radially through the downstream annular part 24, with a shape similar to the shape of the section of the arm 22 to be placed. In opening up in the downstream direction, the opening 30 also passes through an downstream annular edge 32 of the shroud, the geometry of which is particularly complex, particularly due to the fact that this edge 32 participates in the structural character of the shroud. This edge 32 has two lips or annular grooves 34 that extend radially outwards, as can best be seen on FIG. 3. This figure also includes a representation of a radially internal surface 36 of the edge 32, that delimits a hollow annular zone 38 that is open radially inwards. The surface 36 is concave, for example with a generally U shape tapered radially inwards. It remains shallow, for example with a depth of between 3 and 5 mm, this dimension depending on large tolerances resulting from manufacturing the outer shroud 16 by moulding.

Figure 3:
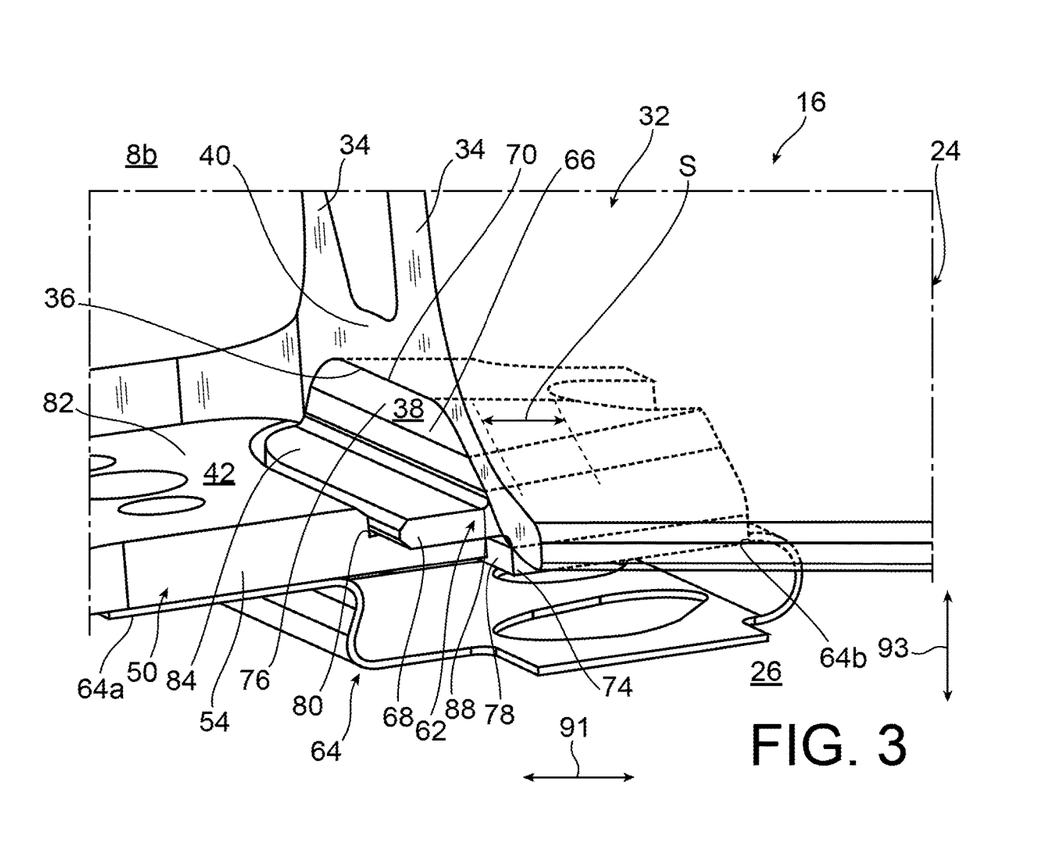
FIG. 3 represents an enlarged perspective view of a part of the outer shroud shown on the previous figure.
Figure 4:
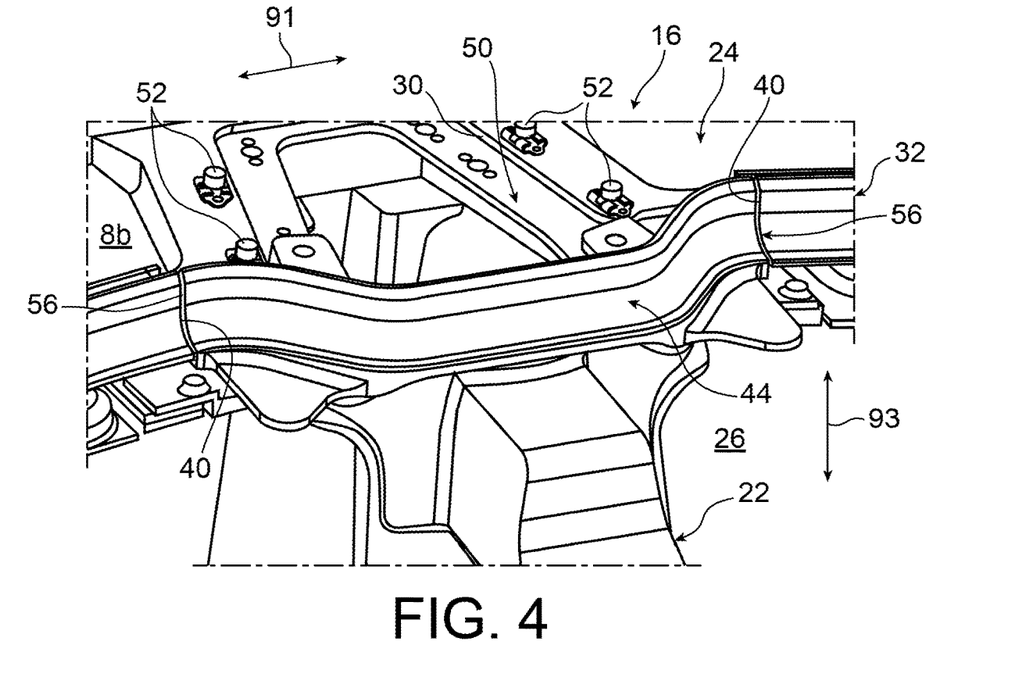
FIG. 4 represents a perspective view similar to that on FIG. 2, with an arm passing through the fan flow stream of the turbojet.
Figure 5:
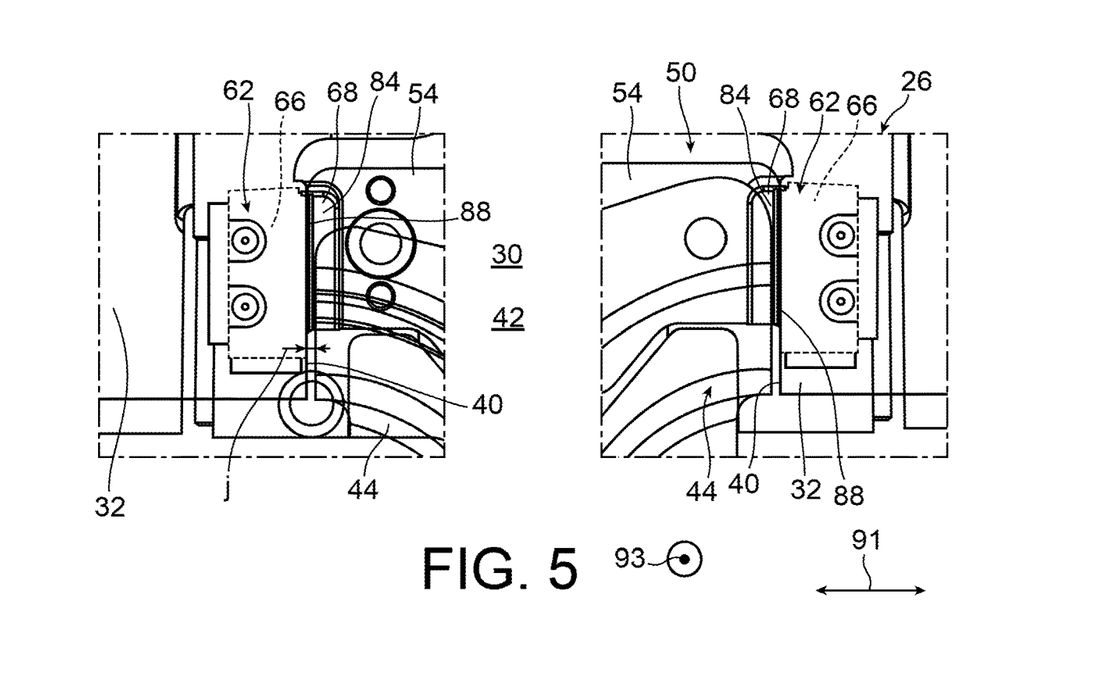
FIG. 5 represents a top view of the perspective view on FIG. 4.

Therefore the downstream annular edge 32 is not continuous over 360°, since it is interrupted by the opening 30. Due to this interruption, the edge 32 has two circumferential end surfaces 40 that face each other and that, being circumferentially separated from each other, delimit a housing space 42 between them that will contain a radially external end 44 of the arm 22.

To make the interface between the arm 22 and the downstream part 24 of the shroud, the shroud also comprises a connection element, in this case a perforated connection plate 50, preferably metallic and plane or slightly curved. In this preferred embodiment, the general shape of the plate 50 is a U or a V, which broadly follows the contour of the opening 30, restricting the passage section of this opening, and being axially open at the same level as the opening 30. The perforated plate 50 is fixed to the downstream part 24 making use of conventional attachment means, such as bolts 52. Alternatively, the perforated plate 50 could have a shape following a closed line, for example a substantially rectangular or trapezoidal shape.

The plate 50 is arranged radially inside the shroud. It has two circumferential plate ends 54, that are formed at the two ends of the U or the V respectively, also extending circumferentially along opposite directions. Each of these two circumferential plate ends 54 is associated with one of the two circumferential end surfaces 40, defining two junction zones 56 sensitive to air sealing and fire resistance respectively. More precisely, steps are taken such that there is no or only very little air exchange between the fan compartment 8*b* and the fan flow stream 26, particularly to avoid leaks outside this flow stream, and it is also required to prevent a fire initiated in the compartment 8*b* from propagating in the flow stream 26.

The invention thus includes a particular device 60 at each of these two junction zones 56, to satisfy the air sealing and fire resistance functions. In this respect, concerning air sealing, it may for example be required to limit leaks to a maximum flow of 0.54 g/s. Concerning fire resistance, in addition to complying with the requirements of standards ISO 2685-1998 and AC 20-135, the most severe conditions are considered, namely resistance to fire in flight and resistance to fire on the ground. In particular, this implies the design of a solution to perform the fire resistance function under the following conditions:

flame temperature: 1100±80° C.;
vibration: ±0.4 mm at a frequency of 50 Hz;
pressure: 0.4 bars during the first 5 minutes of the fire test;
test duration: 15 min, broken down into 2 phases:
5 min: Applied positive pressure; and
10 min: Atmospheric pressure;
self-extinction within a limited time.

In the remainder of the description, only one of the two devices 60 will be described, it being understood that the two devices may have identical or similar designs, for example being designed to be symmetric about a longitudinal plane of the turbojet passing through the axis 2.

The device 60 will thus provide air sealing and fire resistance between the fan compartment 8*b* and the fan flow stream 26. It is formed firstly from a functional air sealing and fire resistance part 62, and secondly from a plate spring 64 forcing the part 62 into contact with the outer shroud 16. More precisely, the functional part 62 is divided into two portions fixed to each other, namely a pad 66 and a ledge 68. The pad 66 is formed in the hollow annular zone 38 of the downstream edge 32. It has a contact surface 70 with a shape complementary to the shape of the radially internal surface 36 delimiting this zone 38, therefore convex and with a generally U shape tapered radially inwards. The pad 66 functions like a plug and fills all or some of the hollow zone 38 located close to the circumferential end surface 40. As can be best seen on FIGS. 3 and 6, the contact surface 70 of the pad 66 locally matches the entire surface 36 at least over an angular sector S of this surface, this sector S being centred on the axis 2. Furthermore, at this angular sector S, the pad 66 may have a radially internal part 74 extending beyond the hollow annular zone 38, in other words outside this zone as can be seen on FIG. 6. This figure shows that for the part of the pad 66 located radially outwards from the ledge 68, this part is terminated by a circumferential end surface 76 formed substantially in the same plane as the associated circumferential end surface 40. Consequently, the housing space 42 is preserved, and thus the device 60 does not in any way hinder subsequent assembly of the external radial end 44 of the arm 22.

Figure 6:
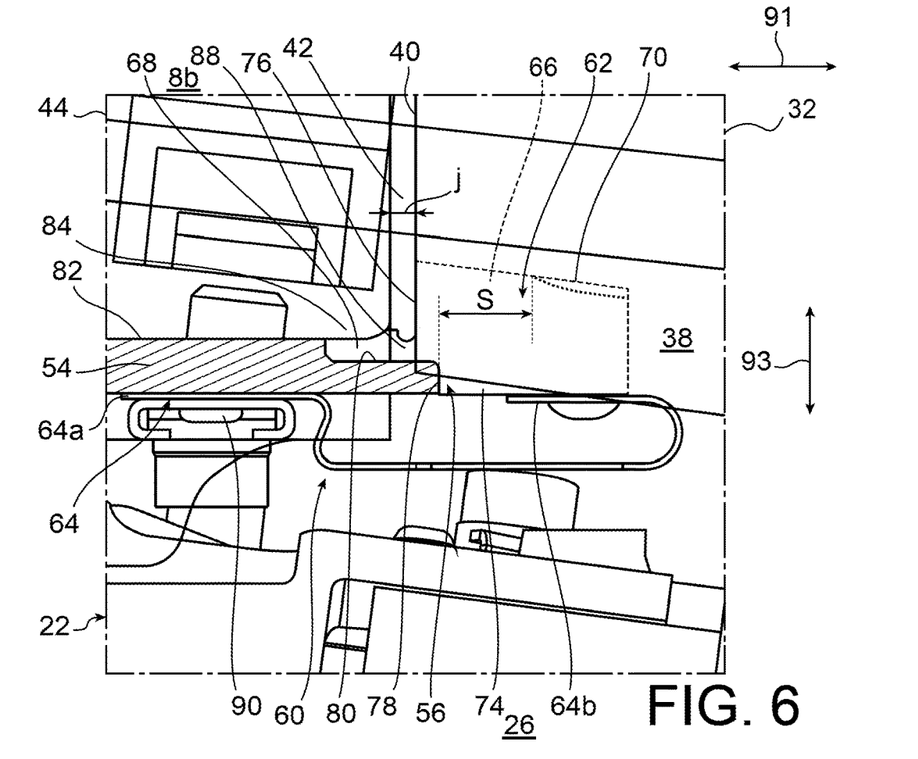
FIG. 6 represents a perspective view similar to that on FIG. 3, in which the arm is represented.

The other circumferential end surface 78 that is radially inwards from the ledge 68, is located further set back along the circumferential direction 91, thus forming a recess in which the terminal part of the circumferential plate end 54 fits. This terminal part also forms spot facing 80 that acts as a seat for the ledge 68, that actually rests on this spot facing. The presence of this spot facing can give a substantially plane surface for the radially outer end support 44 of the arm, this surface being effectively formed from the radially external surface 82 of the two plate ends 54, and by the radially external surface 84 of the two associated ledges 68 resting in their spot facing 80. Nevertheless, to guarantee the seal, the ledges 68 project radially beyond the plate 50 before assembly of the arm 22.

The ledge 68 projects from surfaces 76, 78 of the pad 66, extending circumferentially beyond the circumferential end surface 40 of the downstream edge of the shroud 32. This projection is along the direction of the other circumferential end surface 40, so that the ledge 68 rests in the spot facing 80 that terminates close to this surface 40, and possible even slightly penetrates into the hollow zone 38 of the edge 32.

After the arm 22 is assembled on the perforated plate 50 by conventional bolt type means (not referenced), the ledge 68 is radially clamped between the terminal part of the circumferential plate end 54, and the radially outer end 44 of this arm 22.

The ledge 68 comprises a connection zone 88 with the pad 66, arranged in the circumferential gap J between the end surface 40 of the edge 32, and the external radial end 44 of the arm 22. In this respect, it is noted that despite the presence of the gap J, this end 44 provides continuity of the shape of the downstream annular edge 32, by reconstituting this shape in the housing space 42. However as can best be seen on FIG. 4, this end 44 is not necessarily cylindrical like the edge 32, but it can have a shape adapted to the general shape of the arm 20.

Returning to the connection zone 88 formed in the gap J, this zone has the specific feature that it is thinner than the remaining part of the ledge 68. This reduction in thickness is adopted to confer flexibility on the functional part 62, facilitating pivoting between the ledge 68 and the pad 66 on which the force of the plate spring 64 is applied.

The spring 64 comprises a first end 64*a* fixed onto the circumferential plate end 54 by means of one or several bolts 90, and a second opposite end 64*b* fixed on the radially internal part of the pad 66. Consequently, the plate spring 64 forces the pad into contact in the hollow annular zone 38, on the surface 36, thus guaranteeing the seal and the fire resistance function. In particular, this contact force makes it possible to readjust the relative position of the pad 66 and the edge 32 if it is not satisfactory due to dimensional tolerances, and guarantees that this pad is crushed in the hollow zone. Furthermore, this crushing force is accentuated during operation of the turbine engine, by the pressure of the air flow circulating in the fan flow stream of the turbine engine and applying it in contact with the pad 66.

Figure 7:
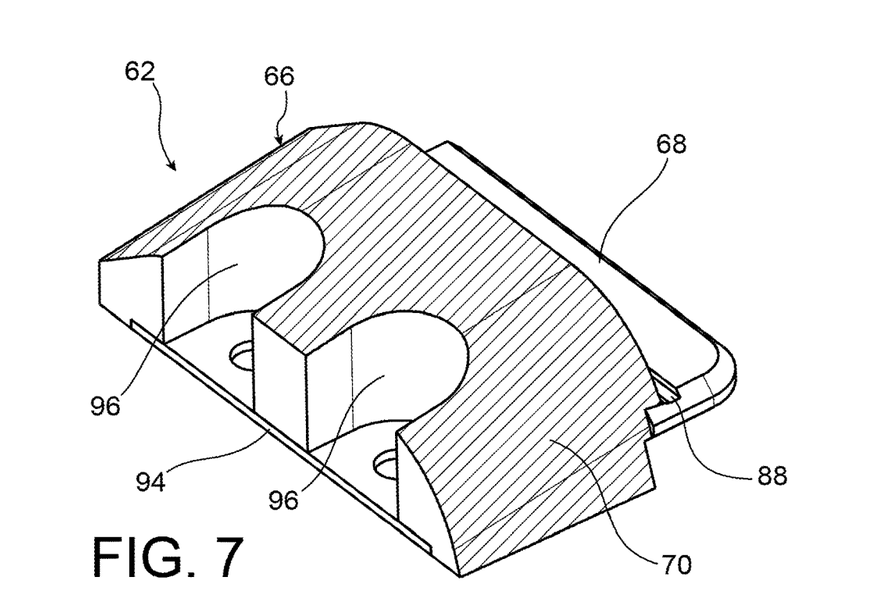
FIG. 7 is a perspective view of the air sealing and fire resistance part of a device forming an integral part of the outer shroud.

To assemble the second end 64*b* on the pad 66, the pad may be provided with a radially internal part in the shape of a plate 94, as can be seen on FIG. 7. The plate 94 is perforated to allow the passage of attachment elements. These passages in the plate open up onto the wells 96 that extend over the entire thickness of the pad 66, as far as its contact surface 70.

Figure 8:
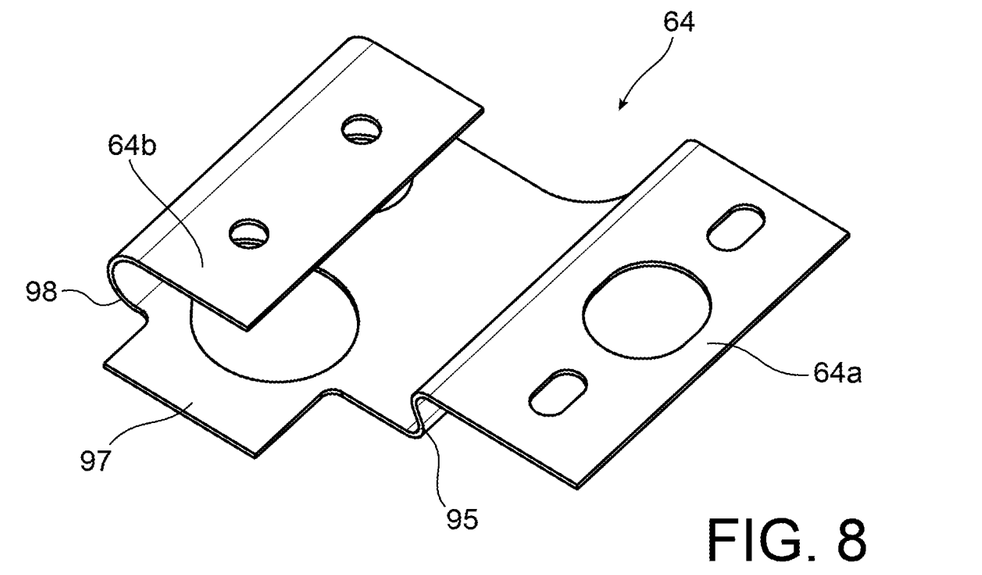
FIG. 8 is a perspective view of a plate spring designed to cooperate with the part shown on FIG. 7.

The plate spring 64 is preferably metallic, for example it may be made of Inconel 718®. It can be obtained by folding/stamping, to have the detailed shape shown on FIG. 8. Starting from the first end 64*a*, the spring has a first curvature 95, in this case an S shape. The spring then continues with a straight or slightly curved strip 97 that will be substantially parallel to the ledge 68 and to the perforated plate 50, and to the ends 64*a*, 64*b*. This strip 97 is then connected to the second end 64*b* by a second curvature 98, in this case a C shape. Perforations can be formed in the strip 97 and in the ends 64*a*, 64*b*, to adapt the longitudinal and radial stiffnesses of the spring.

A compression moulding technique is preferably used for manufacturing the functional part 62 of the device 60. It can be a simple elastomer block, but this block will preferably be combined with one or several layers with different functions.

Figure 9:
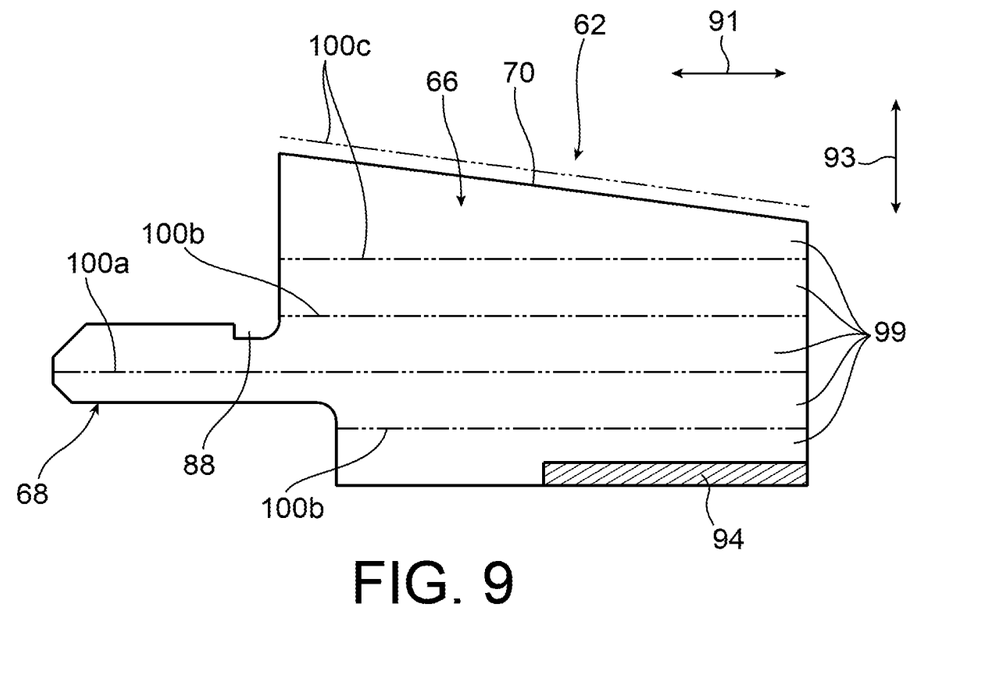
FIG. 9 shows a cross-sectional view of the part shown on FIG. 7.

In the example represented on FIG. 9, the part 62 is formed by superposition in the radial direction 93 of layers made of an elastomer material 99 and preferably a silicone elastomer material, and fibrous functional layers that will now be described.

There will be firstly one or two layers of glass fabric 100*a*, that reinforce the stiffness of the part 32, by passing through the pad 66 and the ledge 68. Two fire resistance layers 100*b* are then provided in the pad 66, on each side of the layer 100*a*, and separated from it by layers of a silicone elastomer material 99. The layers 100*b* may for example be made of ceramic fibre. They are arranged in the zones of the pad most exposed to the flame. Since the silicone elastomer material of the layers 99 degrades into silica in the presence of severe heat, the mesh of the fabrics 100*b* used can retain these degraded particles.

The alternation of layers can be completed in the radially external part of the pad by one or two fibrous aramid layers 100*c*, also to reinforce the stiffness of the assembly. One of these layers 100*c* can be coated on the contact surface 70, to limit risks of the pad 66 being damaged in contact with sharp portions of the shroud. In all cases, regardless of whether or not this contact surface 70 is coated with a protection layer 100*c*, it is preferably machined to have a more precise geometry guaranteeing a more reliable contact in the hollow zone of the shroud edge.

The layers 99, 100*a*-100*c* are preferably parallel to each other, and substantially parallel to the circumferential direction 91 of the outer shroud 16 on which the device 60 is installed. The orientation of the folds of the cloths/fabrics 100*a*-100*c* can also limit deformation of the assembly in the circumferential direction 91, and therefore hold the pad 66 outside the boundaries of the housing space 42, during operation of the turbojet. When the pad 66 is compressed along the radial direction 93, the functional layers 100*a*-100*c* are stressed in tension, and their stiffness limits the creep of the layers 99 made of a silicone elastomer material, along the circumferential direction 91.

Obviously, an expert in the subject can make various modifications to the invention as it has just been described solely through non-limitative examples, within the scope defined by the appended claims.

What is claimed is:

1. An outer shroud of an intermediate casing for a dual flow turbine engine for an aircraft, the shroud comprising:
   a downstream annular part provided with a shroud opening passing radially through the shroud and opening up axially downstream from the shroud, the downstream part comprising a downstream annular shroud edge, of which a radially internal surface delimits a hollow annular zone open radially inwards, said hollow annular zone being delimited radially outwards by said internal surface, the downstream annular edge being interrupted by the shroud opening so as to have two circumferential end surfaces facing each other and delimiting a housing space between them for a radially outer end of an arm that will pass radially through a fan flow of the turbine engine;
   a connecting element, formed by a perforated connection plate, fixed on the downstream annular part of the shroud and arranged radially inwards from the shroud, the element also being designed to be fixed to said arm and forming two circumferential ends fixed to the two circumferential end surfaces of the downstream annular shroud edge, so as to define two junction zones respectively; and an air sealing and fire resistance device, associated with each junction zone, wherein the air sealing and fire resistance device comprises:

an air sealing and fire resistance part comprising:

a first contact device arranged in the hollow annular zone of the downstream annular edge of the shroud, this first contact element having a contact surface with a shape complementary to the shape of said radially internal surface delimiting the hollow annular zone;

a second contact element projecting from the first contact element and extending circumferentially beyond the circumferential end surface of the junction zone concerned, towards the other circumferential end surface, the second contact element bearing on the circumferential end of the junction zone concerned, and that will be tightened between this circumferential end and the radially external end of the arm.

2. The outer shroud according to claim 1, wherein the air sealing and fire resistance device also comprises:

an elastic return means bringing the first contact element into contact inside the hollow annular zone, the elastic return means comprising a first end fixed on the circumferential end of the junction zone concerned, and a second opposite end fixed on the first contact element.

3. The outer shroud according to claim 2, wherein the first contact element is a pad, the second contact element is a ledge, and the elastic return means is a plate spring.

4. The outer shroud according to claim 3, wherein the contact surface of the pad matches the entire angular sector (S) of the radially internal surface delimiting the hollow annular zone, locally at this pad, and this pad has a radially internal part outside said hollow annular zone.

5. The outer shroud according to claim 3, wherein the pad has a circumferential pad end surface located approximately in the same plane as the circumferential end surface of the downstream annular edge of the shroud, in its part located radially outwards from the ledge.

6. The outer shroud according to claim 3, wherein the ledge comprises a reduced thickness connection zone with the pad.

7. The outer shroud according to claim 3, wherein said air sealing and fire resistance part is formed by the superposition of at least one layer of elastomer material, and at least one fibrous layer made of ceramic, glass or meta-aramid, along the radial direction.

8. The outer shroud according to claim 7, wherein said air sealing and fire resistance part comprises at least one glass fibre layer extending through the pad and the ledge.

9. The outer shroud according to claim 3, wherein each circumferential end has a spot facing forming a seat for the ledge of the air sealing and fire resistance device.

10. The outer shroud according to claim 3, wherein said air sealing and fire resistance part is made by compression moulding, and the contact surface of the pad is machined.

11. A dual flow turbine engine for an aircraft, comprising an intermediate casing outer shroud according to claim 1, and an arm passing radially through a fan flow stream of the turbine engine, the turbine engine having a fan compartment and an interflow-stream compartment connected by said arm, a radially outer end of which is forced into contact with radially external surfaces of the two circumferential ends, and in contact with second contact elements associated with the two circumferential ends.

* * * * *